United States Patent [19]
Misson

[11] 3,847,580
[45] Nov. 12, 1974

[54] METHOD OF TEMPERING GLASS
[75] Inventor: George W. Misson, Pittsburgh, Pa.
[73] Assignee: PPG Industries, Inc., Pittsburgh, Pa.
[22] Filed: Mar. 21, 1973
[21] Appl. No.: 343,306

Related U.S. Application Data
[63] Continuation of Ser. No. 40,295, May 25, 1970, abandoned, which is a continuation-in-part of Ser. No. 838,015, June 18, 1969, abandoned, which is a continuation of Ser. No. 596,496, Nov. 23, 1966, abandoned.

[52] U.S. Cl.................... 65/25 A, 65/104, 65/114
[51] Int. Cl............................................ C03b 27/00
[58] Field of Search ............ 65/104, 114, 115, 117, 65/25 A

[56] References Cited
UNITED STATES PATENTS
2,093,040  9/1937  Eckert .................................. 65/114
3,223,507  12/1965  Thomas ................................ 65/114

FOREIGN PATENTS OR APPLICATIONS
850,785  9/1952  Germany
11,495  3/1967  China

Primary Examiner—Arthur D. Kellogg
Attorney, Agent, or Firm—Thomas F. Shanahan; Edward I. Mates

[57] ABSTRACT

Incidents of breakage in glass sheets during tempering are reduced by conducting the quench operation in steps of which the first is the most severe and the others are accordingly less severe, but still such as not to permit untempering of the surfaces of the glass.

4 Claims, 1 Drawing Figure

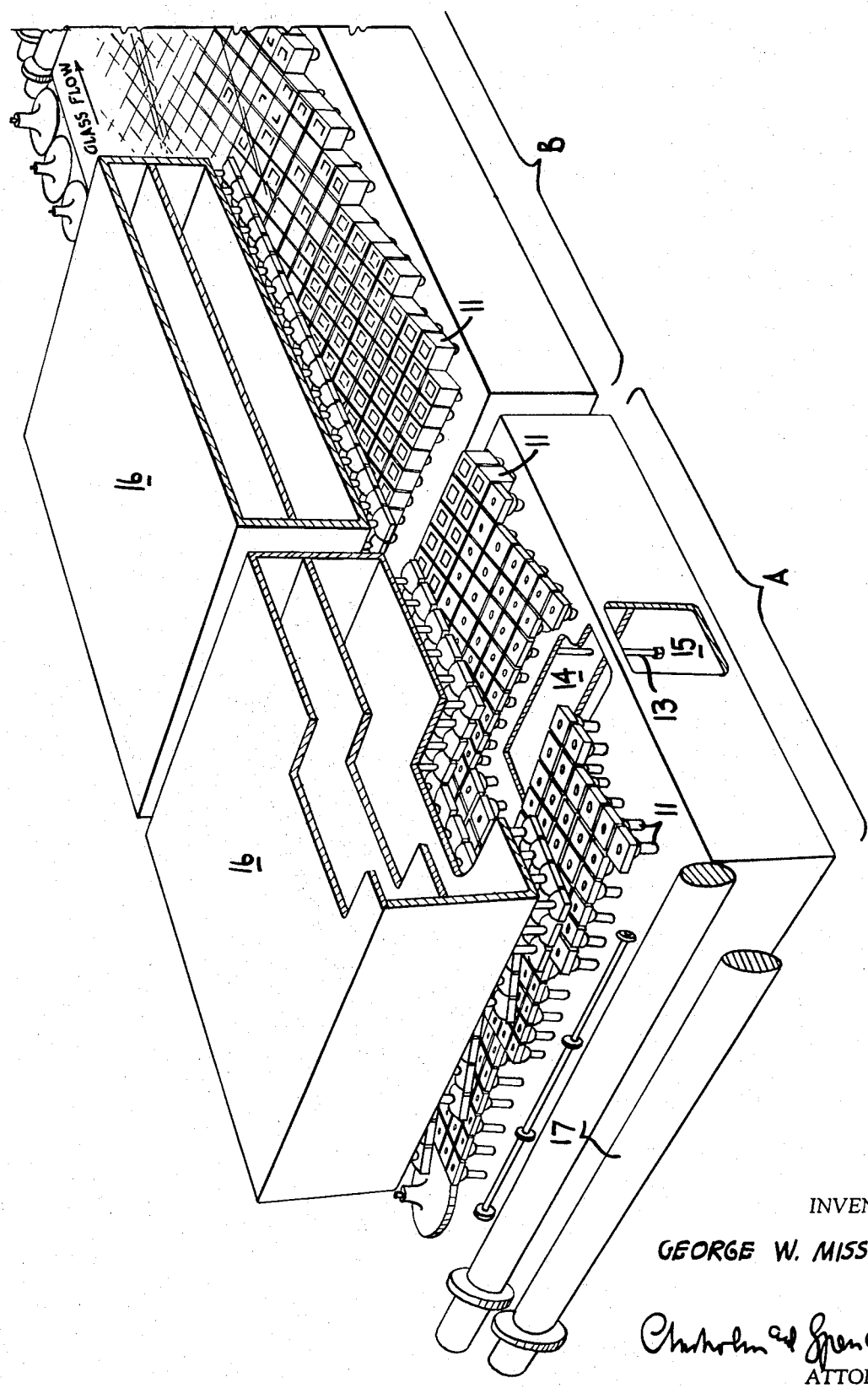

METHOD OF TEMPERING GLASS

CROSS REFERENCES TO RELATED APPLICATIONS

This application is a continuation of application Ser. No. 40,295, filed May 25, 1970, for Method of Tempering Glass, which application is a continuation-in-part of application Ser. No. 838,015, filed June 18, 1969, which, in turn, is a continuation of my application Ser. No. 596,496, filed Nov. 23, 1966, all abandoned.

BACKGROUND OF THE INVENTION

1. Field of the invention:

This invention relates to a method of tempering glass in the sheet form.

2. Description of the prior art:

It is known, for example, from the *Glass Engineering Handbook*, by E. B. Shand (McGraw Hill, 1958), pages 109–110, that the tempering of a sheet of glass involves the purposeful creation therein of a permanent compressive residual stress by the process of rapidly cooling the surfaces thereof so as to produce a rigid envelope, such that upon subsequent cooling of the glass and hardening of the central portion thereof, the said central portion tending to contract three-dimensionally during the said hardening, there are produced in the surface portions of the sheet substantial compressive stresses. This tends to increase the effective strength of sheet of glass involved, since glass is tremendously strong in compression but relatively weak in tension; the result is that, with the surfaces of a sheet of glass being made so as to exhibit a high residual compressive stress, there is required, before a sheet of glass of this kind becomes ruptured, a relatively high and sudden, sharp, tension-generating stress. Glass sheets tempered so as to have a high residual compressive stress in the surface portion thereof are considerably more resistant to fracture, when brought into contact with road stones and the like, than are similar untempered sheets.

Those skilled in the art of tempering sheets of glass have appreciated that the problems involved with the tempering of a sheet of glass become remarkably more severe as the thickness of the sheet of glass decreases. As was indicated in the above explanation, the tempering mechanism depends upon maintaining a central portion of the glass above a deformation temperature, while the surfaces thereof form a rigid envelope. With a piece of glass that is relatively thin, the time in which this can be done is relatively short, and this indicates to those of ordinary skill in the art that, in the case of glass sheets that are relatively thin, it is essential that, at least during the initial stages of the quenching thereof that is to produce in the surface portions thereof a suitable temper, a very rapid cooling rate be used. Morover, if the cooling is done by applying a gaseous medium to the surfaces of the sheet, the gaseous medium must be supplied to the surfaces of the sheet at a very rapid rate.

Before the present invention, it has been usual, in the construction of a gas-hearth bed, to provide a number of modules that are each, whatever the extent of the bed, provided with gas flowing at substantially the same rate. There has not, prior to this invention, been any particular reason for sectionalizing a gas-hearth bed, or any other bed that is used for the support of an edgewise-traveling sheet of glass, so as to minimize the total requirements of power used for the cooling of said sheet of glass.

Eckert U.S. Pat. No. 2,093,040 relates to a tempering process that may be considered as involving two steps, but that patent teaches that in accordance with still earlier art, tempering was done by plunging the glass sheet to be tempered into an oil bath or between chilled metal plates. Moreover, that patent teaches that, instead of being tempered as indicated above, a glass sheet should be tempered by conducting its cooling in stages, such that during the first stage the glass sheet "is cooled as quickly as possible to a temperature which lies at or near or somewhat below the annealing temperature of the glass to be hardened, i.e., that temperature at and below which the temporary stresses are mainly developed." The patent teaches that thereafter the sheet is to be further cooled, but at a slower rate. Eckert makes no disclosure of any gas support, or gas hearth, techniques for quenching.

Thomas U.S. Pat. No. 3,223,507 discloses "lowering the temperature of the supporting gas and the heat source above the glass immediately prior to (i.e., directly in advance of) the flow of quenching air that is impinged upon the heated sheet to temper it." The two-step operation of Thomas concerns things that are done to the sheet before the two-step tempering process of the present invention.

SUMMARY OF THE INVENTION

Glass sheets are brought into contact with supporting gas currents that are, in an initial stage, of such severity that they rapidly cool the surfaces of the glass leaving a compressive surface residual stress therein, and, in a subsequent stage or stages, are such that the glass sheets are kept in contact with currents of gas of such velocity that the surfaces of the sheet do not have an adequate opportunity to untemper themselves, while at the same time, considering the reduced velocity of the gas currents that are brought into contact with the sheet, there is obtained a considerable saving in the power used to effect the bringing of the gas currents into contact with the sheet. To be somewhat more specific, the surfaces of the sheet are not permitted to rise in temperature, after being initially quenched, by more than about 45° C. The invention is of particular use in the tempering of sheets of glass that are about 0.130 inch in thickness and less.

DESCRIPTION OF THE DRAWINGS

A complete understanding of the invention may be obtained from the foregoing and following description thereof taken together with the accompanying drawing, in which:

FIG. 1 is a perspective, partly schematic, partly sectional view, illustrating a two-section quench bed useful in practicing the invention.

In the drawing, the conveying rolls 17 transport glass from a heating section, not shown. Immediately adjacent the conveying rolls 17 is a first quenching Section A which, in turn, is followed by a second quenching Section B. Each quenching section includes a flat bed of modules 11 arranged in a mosaic pattern and uniformly spaced to provide equal unit areas for application of gaseous fluid and equal unit areas for exhausting such fluid. Each module 11 has a long stem 13 smaller in cross section than the upper end or terminal, which projects through a cooling box 14 into a plenum 15, the cooling box and upper surfaces of the plenum acting as a support for the module. The surface of the upper termini of the modules is adjusted to such level that it lies at the same plane and in the same contour as that of the end portion of the gas heating bed. Relatively cool gas, such as air at ambient temperature (about 20°–22° C. at the entrance to the blowers) is supplied to the plenum by blowers, not shown. Especially for quench Section A where plenum pressure is 48–50 ounces per square inch, the air temperature will be between 50° and 70° C.

Above the bed of modules 11, and in such fashion as to be capable of being raised and lowered, is a head assembly 16 which constitutes a mirror image of the bed of modules 11. Alternatively, cooling means such as slots or nozzles may be used in the upper head in conjunction with the lower module bed. It is not necessary that the upper quenching head be a mirror image of the lower support bed so long as the two cooling gradients are uniform. Conveying rolls 17 are adjustable in speed to provide means for rapidly conveying glass from the heating section into the quench. Once in the quench, the glass is transported at a uniform rate.

GENERAL DESCRIPTION OF THE INVENTION

Briefly stated, the gist of the invention lies in the utilization of the gas hearth method and apparatus to quench sheet glass and especially thin sheet glass of 3-millimeter thickness, or less, to a degree of temper and a uniformity of temper conforming to safety code specifications, while at the same time, substantially reducing the power requirements below those required in earlier gas hearth applications.

Early gas hearth quenches in the continuous tempering lines were designed to accommodate sheet glass at a uniform rate of travel through opposed modular heads while supported by the flow from the lower array of modules. The quenching gas input to the entire system was uniform over the entire area of the upper and lower modules, that is to say, for the entire length of the quench.

When using air as the quenching medium, thin glass requires relatively extremely high rates of gas flow to quickly establish the temperature gradient from surface to interior necessary to initiate a rigid envelope with the required stress differential from surface to interior. For example, the power required to generate the necessary flow of air at ambient room temperature to initiate the full tempering of 3-millimeter glass in a typical gas hearth quench is about 34 horsepower per square foot of quench area. If we relate this to a line width of 60 inches, a length of 100 inches and a conveyor speed of 10 inches per second, we arrive at a power requirement in excess of 1400 horsepower.

I have discovered that the horsepower requirements of the continuous gas hearth tempering line can be drastically reduced by sectionalizing the quench mechanism into two or more sections in which the horsepower requirements are reduced after the initial section to effect a reduced rate of quenching by reducing the unit area rate of gas flow.

For instance, by sectionalizing the foregoing quench into an initial section 30 inches in length and a subsequent section 70 inches in length, I can apply the necessary flow of gas for the initial section with an expenditure of about 440 horsepower. In the subsequent section, I reduce the horsepower to 20 horsepower per square foot with a resultant expenditure of about 580 horsepower, thus saving an expenditure of nearly 450 horsepower overall.

THE PREFERRED EMBODIMENT

Referring to the drawings, Section A of the quench line is constructed 30 inches in length and 60 inches in width, while Section B is of the same width, but 40 inches in length. Conveying mechanism within the quench sections is controlled to advance the glass through the quench line at a uniform rate of 10 inches per second.

Example

A 3-millimeter thick rectangular sheet of soda-lime glass of dimensions less than the area of Section A is first heated to a temperature of 670° C. in the heating section and then transferred rapidly to quench Section A via the high speed rolls 17. Air at a gauge pressure of 48 ounces and a temperature of approximately 70° C. is applied to the modules 11 in the bed through plenum 15 and to the corresponding modules or slots carried by the head 16, the total flow rate in Section A being approximately 17,500 standard cubic feet per minute. The glass sheet remains in Section A for 3 seconds during which the surface of the glass falls to 248° C. Thereafter, the glass sheet enters Section B of the quench where air is supplied to the upper and lower modules at the same temperature as Section B, but at a gauge pressure of 35 ounces, the total flow rate in Section B being 20,000 standard cubic feet per minute. Approximately 440 horsepower are required to supply the air for Section A and 320 horsepower for Section B.

Glass emerging from Section B is at a surface temperature of 224° C. and, when cooled to room temperature, has a temper quantified in terms of center tension of 4100 (or more) millimicrons per inch of glass length.

An important feature of the glass so tempered is that, upon fracture, it disintegrates with a very small resultant particle size and a uniform "break pattern"; important features in meeting most safety codes.

To facilitate handling and to avoid relaxation of the differential stress in the glass, I find it desirable to further air cool the glass after emergence from section B of the quench. Thus, a third section of upper and lower modules may be utilized, or the glass may be transferred to rolls and cooled with fans without enclosure. When the gas hearth quench is extended, I utilize air at the same temperature as Sections A and B and apply it through the upper and lower modules at approximately 5-ounces gauge pressure for a path of 50 inches (or more). This only requires an expenditure of 20 horsepower. Fan cooling on rolls requires somewhat more length, and generally more horsepower expenditure, depending upon the degree of cooling achieved.

In the foregoing example, the center plane of the glass reaches a temperature of 480° C. at the end of 3 seconds and a temperature of 315° C. at the end of 7 seconds, being the exit temperatures respectively of Section A and Section B. Because of the reduced rate of surface cooling from Section A to Section B, the surface of the glass momentarily increases in temperature as the glass enters Section B. In the foregoing example, the surface temperature rises about 30° C., thereafter cooling to the temperature stated above.

I claim as my invention:

1. An improved method of tempering soda-lime glass in sheet form which comprises, heating said sheet of glass substantially uniformly throughout its thickness to a temperature approaching its softening temperature, supporting said sheet of glass on a modular gas support bed affording a relatively high heat transfer coefficient, applying to said sheet of glass, as it moves edgewise in a first stage of quenching, supporting flows of cooling gas on one side of said sheet of glass and opposing flows on the opposite side that are at a first and relatively high volumetric flow rate of cooling gas per unit of surface-support area until the center plane temperature of said sheet of glass is reduced to below the strain point of the glass and the surface temperature of said sheet of glass is reduced to below the center plane temperature, and then in a second stage of quenching, applying to said sheet of glass, as it continues to move edgewise, supporting and opposing flows of cooling gas that are at a second and relatively lower volumetric flow rate of cooling gas per unit of surface-support area until the surface and center plane temperatures of said sheet of glass are further reduced to substantially below the strain point of the glass, whereby tempering of the glass is effected with less total power consumption than is required when there is used a single flow rate per unit of surface-support area adequate to obtain the desired degree of temper in said glass.

2. A method as defined in claim 1, characterized in that said first volumetric flow rate and the temperature of the cooling gas supplied thereat are so chosen that the temperature of the center plane in said glass is decreased to about 490° C. or less within about 3 seconds, and in that said second volumetric flow rate and the temperature of the cooling gas supplied thereat are so chosen that the surface temperature of the glass does not thereafter increase by more than about 45° C.

3. A method as defined in claim 1 characterized in that glass is moved through the first and second stage of quenching at a uniform rate.

4. A method as defined in claim 1 characterized in that glass of about 3 millimeters in thickness enters the first stage of quenching at a temperature about 670°C., is cooled therein to a center plane temperature about 480°C. in a time period of about 3 seconds and is further cooled in said second stage to a center plane temperature about 315°C. in a further time period of about 4 seconds in duration.

* * * * *